H. GILL.

Machine for Thrashing and Cleaning Grain.

No. 80,541.    Patented Aug. 4, 1868.

WITNESSES
L. Hailer
P. T. Dodge

INVENTOR
H. Gill
by Dodge & Munn
his attys

United States Patent Office.

HENRY GILL, OF MANSFIELD, OHIO.

Letters Patent No. 80,541, dated August 4, 1868.

---

IMPROVEMENT IN MACHINE FOR THRESHING AND CLEANING GRAIN.

---

The Schedule referred to in these Letters Patent and making part of the same.

---

TO ALL WHOM IT MAY CONCERN:

Be it known that I, HENRY GILL, of Mansfield, in the county of Richland, and State of Ohio, have invented certain new and useful Improvements in Grain-Threshers and Separators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in machines for threshing and cleaning grain, whereby they are rendered more perfect in their operation.

In constructing my improved machine, I proceed to build a frame, and mount therein the threshing-cylinder A, in the usual manner, with the concave, B, above, thus making what is known as an overshot-thresher.

Figure 1:
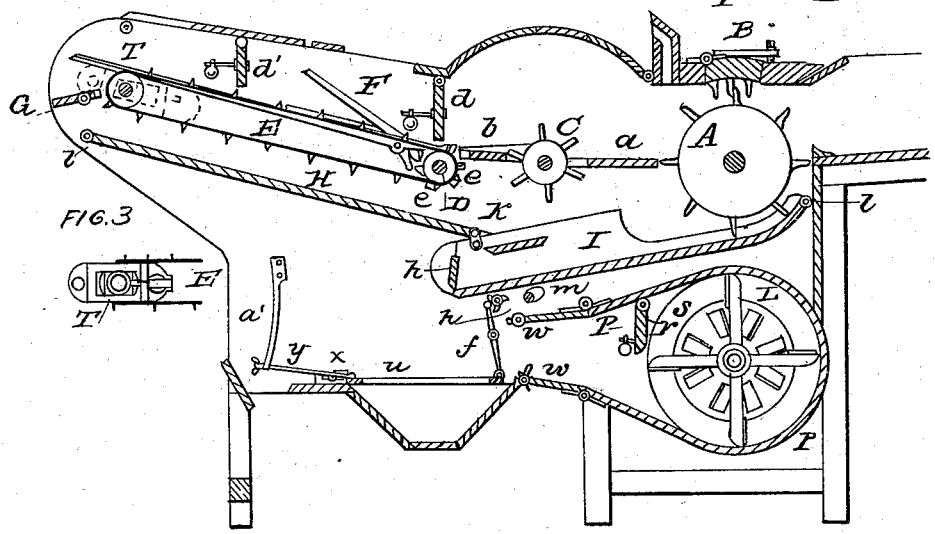
Figure 1 is a longitudinal vertical section of the machine.
Figure 2:
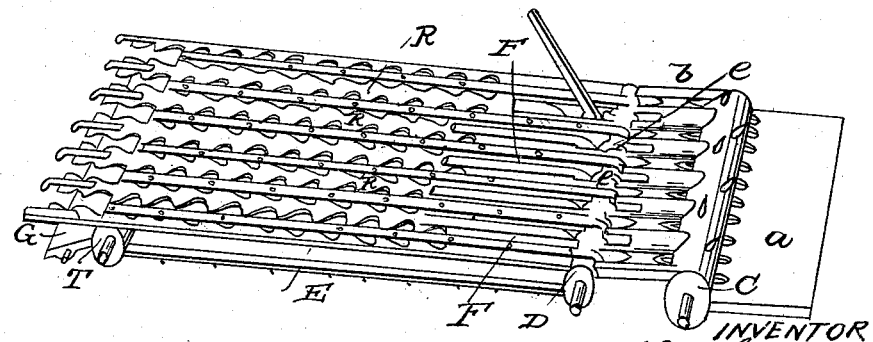
Figure 2 is a perspective view of the straw-carrier and separator detached.

Directly behind the cylinder A is located a horizontal partition or board, $a$, upon which the straw and a portion of the grain fall from the cylinder, and from whence they are carried, by a toothed roller, C, over upon a corrugated horizontal plate, $b$, from whence they are carried by a straw-carrier, consisting of a series of endless belts, E, provided with projecting pins, and being placed alternately between a series of bars R, having notches in their edges, nearly their entire length, as shown in fig. 2, these notches being of such a size as to permit the grain to drop through readily upon a chute-board H, placed underneath, as represented in fig. 1.

The carrier-belts E are driven by a roller, D, located at the front end of the carrier, and on this roller D is secured a series of projections, $e$, which latter, as the roller revolves, strike against a series of beater-arms, F, of which there is one pivoted in a recess or slot in the front end of each of the notched bars R, as shown in figs. 1 and 2.

The projections $e$ are arranged spirally around the roller, so that they come into contact with and operate the beater-arms F, successively, one after the other, thus thoroughly shaking up the straw, as it enters on the carrier, and separates the grain therefrom.

In order to prevent the straw from being carried forward unevenly, in masses, I hinge, over the roller D, a detainer-board, $d$, to the rear side of which a weight may be secured, as shown in fig. 1, which will thus drag or press on the straw, and tend to spread it evenly upon the carrier. Another and similar detainer is hung about midway of the carrier, as represented by $d'$, fig. 1.

Figure 3:
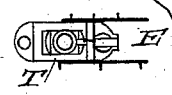

The carrier-belts pass over a roller, T, at the rear end, this roller T being mounted in sliding bearings, as shown more clearly in fig. 3, so that it may be adjusted to keep the belts tight.

A tail-board, G, is located at the rear end of the carrier, to receive the straw therefrom and prevent it from being carried around underneath by the teeth of the belts, there being notches in the edge of this board G for the teeth to pass through, and the tail-board being pivoted so as to be adjusted at any desired angle, as shown in fig. 1.

Underneath the cylinder A, a shoe, I, is hung, to receive the grain and convey it to the screen $u$, this shoe I being pivoted, at its front end, at $l$, and its rear end resting on eccentrics $m$, secured to a shaft passing transversely across the machine under the shoe, there being a ratchet-wheel attached to the end of this shaft, outside of the case, so that, by means of a pawl, the eccentrics $m$ may be adjusted to raise the rear end of the shoe more or less, as may be necessary, to give to it the required inclination to feed the grain properly to the blast and the screen.

A short distance in rear of the shaft on which the eccentrics $m$ are mounted, is placed another transverse shaft, carrying a series of cams, $n$, which strike against the under side of the shoe, and impart to it an up-and-down motion, to cause the grain to flow down it.

Directly under the rear end of the shoe I is placed a screen or sieve, $u$, having its front end pivoted to the lower ends of two vertical arms or levers, $f$, which are pivoted at their centre, and have their upper ends bearing against the cams $n$, as shown in fig. 1.

The rear end of the screen is connected by a rod, $y$, on each side, to a spring-arm, $a'$, so that, as the cams $n$ move the screen in one direction, these springs immediately move it in the opposite direction, the screen thus having imparted to it a reciprocating motion.

A slotted plate, $x$, is secured to the case, on each side, just in rear of the screen, to serve as a stop for the screen to strike against, and, by adjusting these stops, the movement of the screen may be limited as desired.

The shoe I and the chute-board H are connected by links $k$, so that the cams $n$ shall operate both together, and in the rear portion of shoe I there is located a vertical slide, $h$, for the purpose of adjusting and regulating the flow of the grain therefrom, and insuring its falling, in a thin and even sheet, through the blast of air from the fan L, which, as shown by fig. 1, is located directly under the cylinder A.

The fan is constructed in the usual manner, and mounted in a case, P, terminating in a spout or throat in front of and just below the rear end of the shoe I. This throat is composed of an upper and lower wing or board, $w$, both of which are hinged to the body of the case, so that they can be raised or lowered at pleasure, whereby the blast may be thrown upward or downward, more or less, and thus made to strike the falling grain at different angles, as may be desired, and, by narrowing or widening the throat, the blast may be concentrated and rendered more intense, or diffused and weakened, as desired.

Figure 4:
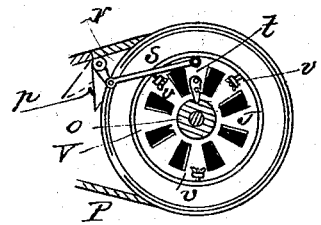
Figures 3 and 4 are views of portions detached.

At each end of the fan-case a series of openings is made for the admission of the air to the fan, as shown in figs. 1 and 4.

Upon the outside of the case, at each side, there is placed a register, V, having corresponding openings, so that, by turning these register-plates, the openings in the case may be closed, more or less, as desired. In order to render these registers automatic in their operation, I hang within the fan-case a float, $p$, hinged at its upper edge, and having attached to it, outside of the case, on each side, an arm, $r$, which is connected by a rod, $s$, to the register-plates V, as shown more clearly in fig. 4. When thus arranged, it will be seen that, if the blast increases, it will cause the float-board $p$ to swing backward, and, as it moves, it will close the registers, and thereby lessen the supply of air, consequently decrease the force of the blast, and as the blast is decreased, the float-board will return to its position, thereby opening the register again, thus making the fan self-regulating and automatic in its operation, thus insuring a uniform and steady blast.

In order to permit the register-plates V to move with ease, and thus be nicely adjusted and very sensitive, I hang these plates on the journal-box of the fan by means of a small rod, $t$, which is secured to the plate V, and has its point resting in a recess in the upper side of the box $o$, as shown in fig. 4, and to prevent the plates V from rubbing against the case, so as to retard their motion, I place in each plate three small friction-rollers, $v$, as also shown in fig. 4.

By these various improvements, I am enabled to produce a machine that operates in a very superior and efficient manner, and that effectually separates the grain from the straw, and thus prevents the great waste that occurs with ordinary machines as generally constructed.

Having thus described my invention, what I claim is—

1. The picker-roll C, in combination with the parts $a$ and $b$, when constructed and arranged to operate substantially as and for the purpose set forth.

2. The beater or shaker-arms F, in combination with the roller D, provided with the cams or tappets $e$, for more thoroughly shaking up the straw and separating the grain therefrom, substantially as described.

3. The straw-carrier, consisting of the belts E, provided with spikes or teeth, and the notched bars R, when arranged to operate substantially as shown and described.

4. The adjustable tail-piece G, in combination with the belts E, substantially as described.

5. The shoe I, when located in a threshing-machine, and pivoted, at its front end, in front of the axis of the threshing-cylinder, substantially as set forth.

6. Providing the shoe I with the adjustable slide $h$, for regulating the delivery of the grain and chaff to the blast, in a thin and even sheet, as set forth.

7. The combination of the float $p$ and the registers V, when applied to a fan, and arranged to operate substantially as described.

8. Operating the screen $u$ by means of the springs $a'$, and the arms $f$ and cams $n$, when arranged as set forth.

9. The combination of the shoe I, inclined chute or grain-board H, and operating-cams $n$, when arranged for joint operation, substantially as described.

HENRY GILL.

Witnesses:
　Jacob Laird,
　Geo. A. Clugston.